(12) United States Patent
Danzy et al.

(10) Patent No.: US 10,641,668 B2
(45) Date of Patent: May 5, 2020

(54) MEASURING DEFORMATION OF A COMPRESSION SPRING TO MONITOR PERFORMANCE OF A SAFETY VALVE

(71) Applicant: Dresser LLC, Addison, TX (US)

(72) Inventors: Roger Dale Danzy, Pineville, LA (US); Rajesh Krithivasan, Jacksonville, FL (US)

(73) Assignee: Dresser, LLC, Addison, TX (US)

( * ) Notice: Subject to any disclaimer, the term of this patent is extended or adjusted under 35 U.S.C. 154(b) by 0 days.

(21) Appl. No.: 15/878,152

(22) Filed: Jan. 23, 2018

(65) Prior Publication Data

US 2019/0226926 A1 Jul. 25, 2019

(51) Int. Cl.
| | |
|---|---|
| G01L 5/00 | (2006.01) |
| F16K 37/00 | (2006.01) |
| F16K 17/04 | (2006.01) |
| F16K 17/06 | (2006.01) |
| G01L 17/00 | (2006.01) |

(52) U.S. Cl.
CPC ............ *G01L 5/0038* (2013.01); *F16K 17/04* (2013.01); *F16K 17/048* (2013.01); *F16K 17/06* (2013.01); *F16K 37/0041* (2013.01); *F16K 37/0083* (2013.01); *G01L 17/005* (2013.01); *F16K 17/0413* (2013.01); *F16K 17/0466* (2013.01)

(58) Field of Classification Search
CPC ... G01L 5/0038; G01L 17/005; F16K 17/048; F16K 17/06; F16K 37/0041; F16K 37/0083; F16K 17/0413; F16K 17/0466
USPC .................................................... 73/862.582
See application file for complete search history.

(56) References Cited

U.S. PATENT DOCUMENTS

| | | | |
|---|---|---|---|
| 2,813,709 A | 11/1957 | Brier | |
| 4,805,461 A | 2/1989 | Gupta et al. | |
| 5,220,843 A * | 6/1993 | Rak | G01L 5/0061 251/129.04 |
| 5,323,142 A * | 6/1994 | Fain | G01L 5/0061 137/554 |
| 5,425,270 A | 6/1995 | McDonald et al. | |
| 5,469,737 A * | 11/1995 | Smith | G01L 5/0061 137/552 |
| 6,124,806 A | 9/2000 | Cunningham et al. | |
| 6,240,789 B1 | 6/2001 | Morlan et al. | |
| 6,283,138 B1 | 9/2001 | Friend et al. | |
| 6,555,766 B2 | 4/2003 | Breed et al. | |
| 7,516,656 B2 * | 4/2009 | Nogami | F16K 37/0083 73/168 |

(Continued)

FOREIGN PATENT DOCUMENTS

JP H11201310 * 7/1999

*Primary Examiner* — Octavia Hollington
(74) *Attorney, Agent, or Firm* — Paul Frank + Collins P.C.

(57) ABSTRACT

A safety valve is outfit with sensors to monitor performance. The safety valve may include valve mechanics comprising a closure component moveable relative to a seat. The device may also have a pre-load unit coupled with the closure component. The pre-load unit may utilize a coiled compression spring to generate spring force to keep the closure component in contact with the seat. A strain gauge may be disposed on the compression spring to measure strain, for example, shear strain in the compression spring. Analysis of this data may predict set pressure (or "set point"). This prediction may, in turn, form a basis for an alert or other indicator that the safety valve requires maintenance or repair.

20 Claims, 10 Drawing Sheets

(56) References Cited

U.S. PATENT DOCUMENTS

| | | | |
|---|---|---|---|
| 7,836,784 B2* | 11/2010 | Nogami | F16K 37/0083 |
| | | | 73/865.9 |
| 8,000,909 B2 | 8/2011 | Danzy | |
| 8,474,334 B2 | 7/2013 | Kiesbauer et al. | |
| 9,068,665 B2* | 6/2015 | Kiesbauer | F16K 37/0083 |
| 9,851,014 B2* | 12/2017 | Spencer | F16K 37/0075 |
| 9,890,609 B2* | 2/2018 | Lymberopoulos | E21B 34/02 |
| 2002/0029808 A1 | 3/2002 | Friend et al. | |
| 2003/0033885 A1 | 3/2003 | Knox et al. | |
| 2004/0031911 A1* | 2/2004 | Hoffmann | F01L 9/04 |
| | | | 250/227.19 |
| 2010/0106434 A1 | 4/2010 | Killion et al. | |
| 2010/0236319 A1 | 9/2010 | Penman | |
| 2015/0082902 A1 | 3/2015 | McCormick | |

\* cited by examiner

FIG. 7

| Variables | Set Pressure 500, Rated Lift 0.292 | Set Pressure 150, Rated Lift 1.68 |
|---|---|---|
| Spring number | 0216CR | 0712E |
| Spring rate | 1,335 | 2,850 |
| Wire diameter | 0.4375 | 1.313 |
| Spring ID | 1.625 | 4.25 |
| Spring OD | 2.75 | 7.75 |
| Mean diameter 1 | 2.0625 | 5.563 |
| Mean diameter 1 | 2.3125 | 6.437 |
| Rigidity modulus of spring material | $1.15 \times 10^7$ | $1.15 \times 10^7$ |
| Seat diameter | 1.122 | 6.315 |
| Spring force at set pressure | 494.36 | 4,698.16 |
| Spring force tolerance at set pressure | 4.94 | 46.98 |
| Differential force to measure 1% of full lift | 3.90 | 47.88 |
| C | 4.71 | 4.24 |
| K | 0.89 | 0.88 |
| Shear stress at set pressure | 27,717.47 | 25,935.57 |
| Shear strain at set pressure | $2.41 \times 10^{-3}$ | $2.26 \times 10^{-4}$ |
| Strain to predict within 1% of set pressure | $2.410 \times 10^{-5}$ | $2.255 \times 10^{-6}$ |
| Strain measurement to predict 1% of rated | $1.901 \times 10^{-5}$ | $2.298 \times 10^{-6}$ |

Calculation data and variables for Compression Spring

FIG. 8

| Variables | Set Pressure 500, Rated Lift 0.292 | Set Pressure 150, Rated Lift 1.68 |
|---|---|---|
| Spring number | 0216CR | 0712E |
| Spring rate | 1,335 | 2,850 |
| Compression screw ID | 0.5 | 0.9375 |
| Compression screw OD | 0.84375 | 2 |
| Screw material | 416SS | 416SS |
| Young's modulus | $2.9 \times 10^7$ | $2.9 \times 10^7$ |
| Seat diameter | 1.122 | 6.315 |
| Spring force at set pressure | 494.36 | 4698.16 |
| Spring force tolerance at set pressure | 4.94 | 46.98 |
| Differential force to measure 1% of full lift | 3.90 | 47.88 |
| Compressive stress at set pressure | 14,016.39 | 637.80 |
| Compressive strain at set pressure | $4.833 \times 10^{-4}$ | $2.2 \times 10^{-5}$ |
| Strain to predict within 1% of set pressure | $4.833 \times 10^{-6}$ | $2.199 \times 10^{-7}$ |
| Strain measurement to predict 1% of rated | $3.811 \times 10^{-6}$ | $2.241 \times 10^{-7}$ |

Calculation data and variables for Compression Screw

FIG. 9

| Variables | Set Pressure 500, Rated Lift 0.292 | Set Pressure 150, Rated Lift 1.68 |
|---|---|---|
| Spring number | 0216CR | 0712E |
| Spring rate | 1,335 | 2,850 |
| Spring washer ID | 1.625 | 4.25 |
| Spring washer OD | 2 | 7.5 |
| Spring washer thickness | 0.25 | |
| Spring washer material | 316SS | 316SS |
| Young's modulus | $2.83 \times 10^7$ | $2.83 \times 10^7$ |
| Seat diameter | 1.122 | 6.315 |
| Spring force at set pressure | 494.36 | 4698.16 |
| Spring force tolerance at set pressure | 4.94 | 46.98 |
| Differential force to measure 1% of full lift | 3.90 | 47.88 |
| Compressive stress at set pressure | 1,666.92 | 3,750.78 |
| Compressive strain at set pressure | $5.89 \times 10^{-5}$ | $1.33 \times 10^{-4}$ |
| Strain to predict within 1% of set pressure | $5.89 \times 10^{-7}$ | $1.325 \times 10^{-6}$ |
| Strain measurement to predict 1% of rated | $4.645 \times 10^{-7}$ | $1.33 \times 10^{-4}$ |

Calculation data and variables for Spring Washer

FIG. 10

| Variables | Set Pressure 500, Rated Lift 0.292 | Set Pressure 150, Rated Lift 1.68 |
|---|---|---|
| Spring number | 0216CR | 0712E |
| Spring rate | 1,335 | 2,850 |
| Spindle washer OD | 0.4375 | 1.75 |
| Spring washer material | 416SS | 416SS |
| Young's modulus | $2.9 \times 10^7$ | $2.9 \times 10^7$ |
| Seat diameter | 1.122 | 6.315 |
| Spring force at set pressure | 494.36 | 4698.16 |
| Spring force tolerance at set pressure | 4.94 | 46.98 |
| Differential force to measure 1% of full lift | 3.90 | 47.88 |
| Bending stress at set pressure | 3,288.51 | 1,953.27 |
| Bending strain at set pressure | $1.134 \times 10^{-4}$ | $6.74 \times 10^{-5}$ |
| Strain to predict within 1% of set pressure | $1.134 \times 10^{-6}$ | $6.75 \times 10^{-7}$ |
| Strain measurement to predict 1% of rated | $8.942 \times 10^{-7}$ | $6.864 \times 10^{-7}$ |

Calculation data and variables for Spindle

MEASURING DEFORMATION OF A COMPRESSION SPRING TO MONITOR PERFORMANCE OF A SAFETY VALVE

BACKGROUND

Thermal hydraulic power plants use "fail-safe" devices to protect against rapid increases in pressure on lines that carry cooling water and steam. Also known as "safety" valves, or "pressure relief" valves, these devices are necessary to avoid "overpressure" conditions that can cause damage to equipment or parts of facilities. The potential for extensive damage, particularly at nuclear facilities, is one reason that operators must monitor performance of these devices. Routine checks to evaluate performance of safety valves are also necessary to ensure that the safety valves meet set, regulatory performance standards. These checks often focus on set pressure (or "set point"), which defines the pressure at which the safety valve opens to relieve pressure in the process line. Failure of just one device, by even as little as 1% of set pressure, for example, may require operators to evaluate each and every one found in the facility. This "fleet" evaluation may cost operators in both labor and downtime because of the hundreds of safety valves that are found at the facility.

SUMMARY

The subject matter of this disclosure relates to improvements to avoid costly labor and facility downtime that often results from these comprehensive fleet evaluations. Of particular interest herein are safety valves that generate data that reflects mechanical properties of load-generating components, like a coiled, compression spring. This data correlates well with set point and other operating metrics for the safety valve. In this way, the embodiments provide means to alert plant operators and engineers to performance defects that may fail to meet requirements so as to facilitate timely maintenance or evaluation outside of any normally mandated performance checks.

The embodiments herein offer an advantage over practices-to-date that monitor performance of valve assemblies. These practices may use strain gauges, but data from these gauges typically relates to fluid pressure (upstream of the valve) or strain on components like the valve stem (or spindle). The compression spring, on the other hand, is better suited for strain measurements because it provides more area to mount the strain gauge and because the compression spring is particularly sensitive to operation of the device. The sensitivity is particularly useful to predict set pressure, as shown in the Tables 1 and 2 below, which compare calculated strain values for the compression spring ("Spring") and for other components, like the spindle, compression screw ("Screw"), and spring washer ("Washer") on valves rated for different set pressure.

TABLE 1

| Set Pressure 500, Rated Lift 0.292 | | | | |
|---|---|---|---|---|
| | Spring | Screw | Washer | Spindle |
| Strain to predict within 1% of SP | 0.0000241 | 0.0000048 | 0.0000006 | 0.0000011 |
| % Difference relative to Spring: | | 20.05% | 2.44% | 4.70% |

TABLE 2

| Set Pressure 150, Rated Lift 1.68 | | | | |
|---|---|---|---|---|
| | Spring | Screw | Washer | Spindle |
| Strain to predict within 1% of SP | 0.0000023 | 0.0000002 | 0.0000013 | 0.0000007 |
| % Difference relative to Spring: | | 9.75% | 58.77% | 29.87% |

Calculations for the values in Table 1 and 2 above are based the references set forth in Table 3 below (see FIGS. 7, 8, 9, and 10 for data that describes variables and assumptions).

TABLE 3

| Component | Reference | Chapter |
|---|---|---|
| Spring | Shigley & Mischke, Mechanical Engineering Design, 5$^{th}$ Edition | 10 |
| Screw | Shigley & Mischke, Mechanical Engineering Design, 5$^{th}$ Edition | 2 |
| Washer | Young and Budynas, Roarks Formulas for Stress and Strain11 | 11 |
| Spindle | Shigley & Mischke, Mechanical Engineering Design, 5$^{th}$ Edition | 2 |

The information in Tables 1 and 2 above show that the strain measured in the spring is at least 60% more than strain measured in the other components (e.g., screw, washer, spindle, etc.) found on the valve assembly. The findings indicate that the embodiments are more likely to detect very small changes in performance characteristics because such changes would result in changes in strain that are too small to be measured on the other components on the valve assembly.

DRAWINGS

Reference is now made briefly to the accompanying drawings, in which:

FIG. 7 depicts a table of data for use to calculate strain values for a compression spring for use in the safety valve of FIG. 6;

FIG. 8 depicts a table of data for use to calculate strain values for a compression screw for use in the safety valve of FIG. 6;

FIG. 9 depicts a table of data for use to calculate strain values for a spring washer for use in the safety valve of FIG. 6; and FIG. 10 depicts a table of data for use to calculate strain values for a spindle for use in the safety valve of FIG. 6.

Figure 1:
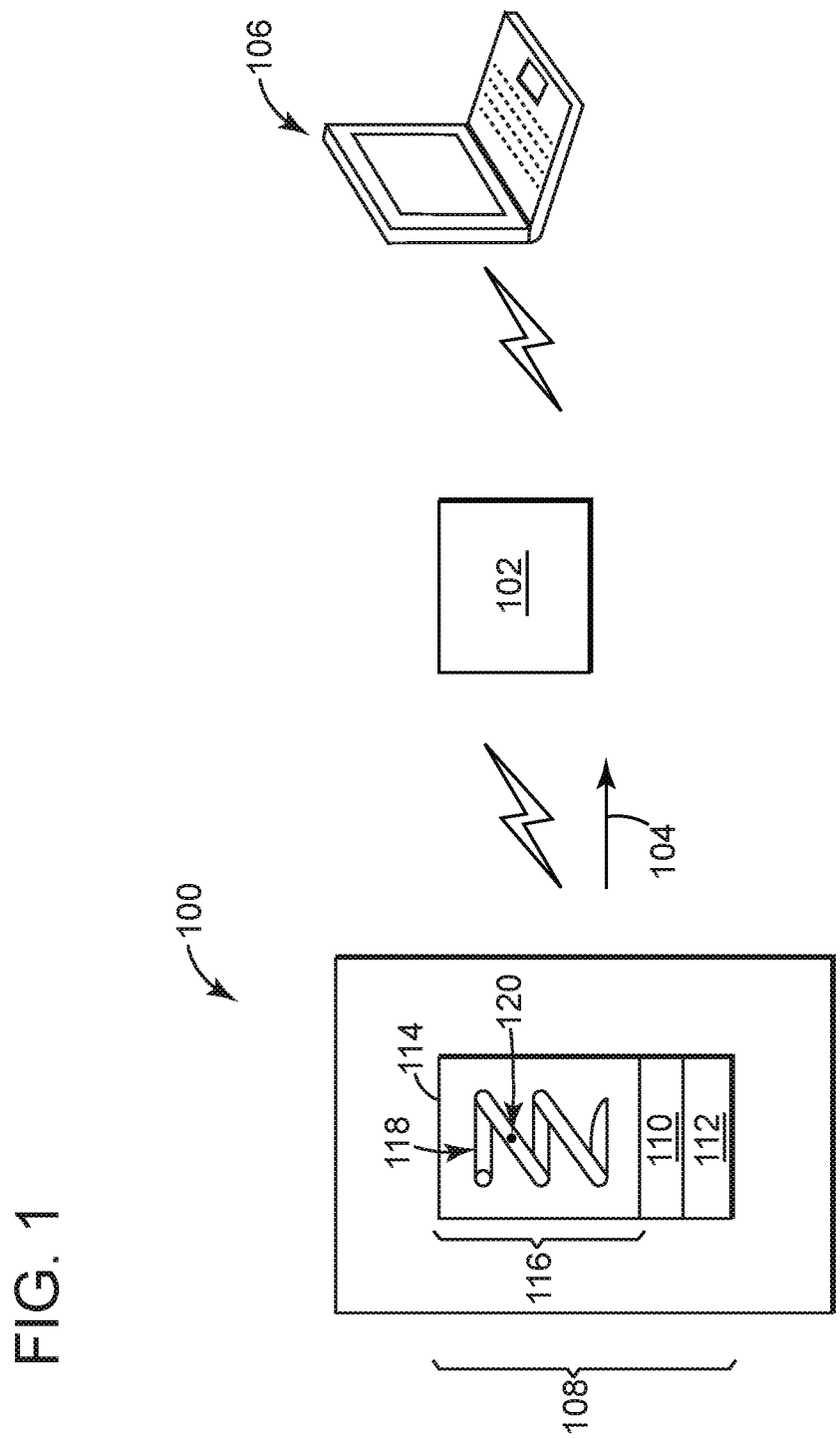
FIG. 1 depicts a schematic diagram of an exemplary embodiment of a safety valve.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes embodiments of a safety valve that can generate data in situ in position on a process line. The embodiments measure mechanical properties of a component, namely, a compression spring, which differs from practices-to-date that focus on operating conditions, like ambient temperature or humidity in proximity to the safety valve, fluid pressure upstream and downstream of the device, or even physical condition (e.g., location) or mechanical properties of certain parts, like the valve stem. Use of the compression spring, on the other hand, is beneficial because this component is particularly sensitive to operation of the device. The resulting data is useful to predict changes in set point. As an added benefit, the data may show that the safety valve was open to relieve pressure and provide basis to calculate volume of material that was lost, among other operating metrics for the device. These features can benefit plant operators and, ideally, avoid costly and time-consuming analysis (and maintenance) that may result from mandatory checks. Other embodiments are within the scope of the subject matter.

FIG. 1 depicts a generally, schematic diagram of an exemplary embodiment of a safety valve 100. This embodiment may couple with a monitor unit 102 to exchange data via a signal 104. The monitor unit 102 may also couple with a remote terminal 106, like a computer (e.g., a laptop or a desktop) or handheld device (e.g., tablet or smartphone). As shown, the safety valve 100 may comprise valve mechanics 108 with a closure member 110 and a seat 112. A pre-load unit 114 is in position to generate a load L on the closure member 110. The pre-load unit 114 may include a biasing component 116, like a coiled, compression spring 118, that generates spring force F for this purpose. A sensor 120 may couple with compression spring 118.

Broadly, the safety valve 100 may be configured to generate data that relates to components on the device. These configurations may measure deformation, for example, strain in the compression spring 118. Changes in strain may result from a variety of factors that can influence performance of the safety valve 100. Strain is particularly beneficial to identify "relaxation" of the compression spring 118, which may vary spring force F and adversely impact set point of the safety valve 100. Factors that can cause spring relaxation may include (a) exposure to high ambient temperatures, (b) export to high ambient temperatures over time, (c) exposure to cyclic temperature changes over time, (d) operational temperature changes, (e) material property degradation of loaded pressure relief valve parts, (f) permanent deformation of pressure relief valve parts, (g) operational failure on the device (e.g., hang-up, galling, localized yielding, etc.), (h) pipe load inlet flange, and (i) pipe loads at outlet flange, among others. For large facilities, the operator can leverage the embodiments across an entire fleet of devices, for example, to ensure that appropriate pre-emptive maintenance or repair occurs prior to any mandatory checks. This feature may greatly reduce the likelihood that any one device would fail at the mandatory check and, thus avoid the need to perform whole fleet evaluations that are costly to perform and can result in additional, unplanned downtime for the facility.

The monitor unit 102 may be configured to process strain data. These configurations can quantify (or qualify) values that predict set point or other operating metrics for the safety valve 100. The terminal 106 may provide an interactive user interface that displays these values for review by plant operators. This interface may present the values in a way that allows plant operators to readily evaluate performance of the safety valve 100 in real-time or contemporaneously with operation of the safety valve 100.

The valve mechanics 108 may be configured to protect against overpressure conditions. The configurations may find use in thermal-hydraulic power plants, like nuclear facilities, that flow cooling water at very high pressures to dissipate temperature of boilers or reactors. This disclosure does contemplate, however, that the concepts herein may apply to similar situated devices and systems that handle liquids across a range of pressure. Typically, the device defaults to a closed position with the closure component 110 in contact with the seat component 112. Suitable construction of components 110, 112 creates a metal-to-metal seal. This feature is beneficial to allow the valve 108 to operate under extreme temperatures or pressure, as well with caustic or hazardous materials.

The pre-load unit 114 is configured to maintain the metal-to-metal seal even under high pressure downstream of the closure component 110. These configurations may include mechanics to pre-load the biasing component 116. These mechanics may compress the compression spring 118 by an amount that generates spring force F necessary to achieve load L to maintain the safety valve 100 in its closed position and prevent flow of material through the seat 112. Pressure downstream of the closure component 110 that exceeds the load L may compress the compression spring 118 to cause the closure component 110 to move away from the seat 112. Material will flow through the seat 112 in this open position. The safety valve 100 remains open until pressure downstream of the closure member 110 falls below the load L, allowing the compression spring 118 to return to its previous closed position.

The sensor 120 may be configured to measure any changes in deformation of the compression spring 118. Suitable devices may respond to very small changes in strain (e.g., torsional strain, axial strain, bending strain, or shear strain); however, this disclosure does contemplate that devices sensitive to temperature (e.g., surface temperature) or like variables on the compression spring 118 may be included as well. Exemplary strain gauges may comprise an electrical circuit, for example, made of an arrangement of bonded metallic wires or foil forming a grid disposed on a thin, carrier or substrate. One exemplary arrangement forms a Wheatstone bridge circuit, but other arrangements may prevail as well. The Wheatstone bridge circuit is useful because its resistivity is proportional to strain in compression spring 118. The carrier may affix to the compression spring 118 using adhesives, like epoxy, or other suitably situated material. Technology to print, emboss, or engrave the electrical circuit, and other components for the strain gauge, on or into material of the compression spring may also prove useful for manufacture of the device.

Figure 2:
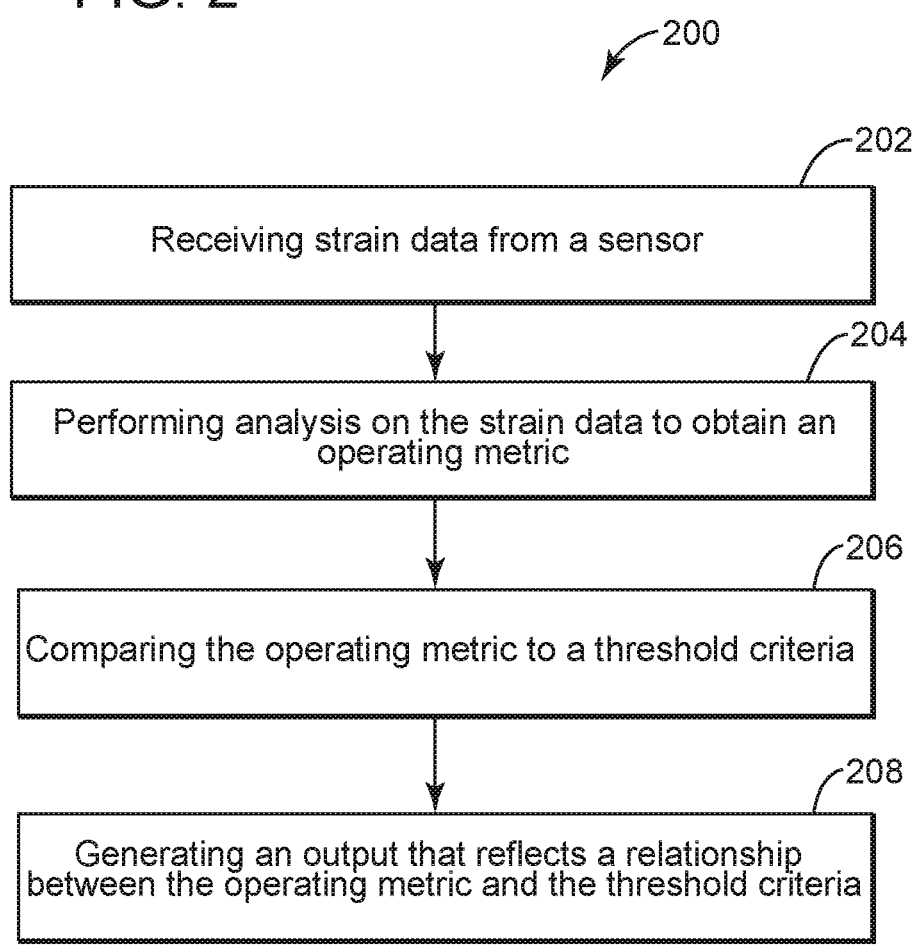
FIG. 2 depicts a flow diagram of an exemplary embodiment of a method to process data from the safety valve of FIG. 1.

FIG. 2 depicts a flow diagram of an exemplary method 200 to use data from the safety valve 100. This diagram outlines stages that may embody executable instructions for one or more computer-implemented methods and/or programs. These executable instructions may be stored on the monitor unit 102 as firmware or software. The stages in this embodiment can be altered, combined, omitted, and/or rearranged in some embodiments.

Operation of the method 200 may enable performance diagnostics of the safety valve 100. The method 200 may include, at stage 202, receiving strain data from a sensor and, at stage 204, performing analysis on the strain data to obtain an operating metric. The method 200 may also include, at stage 206, comparing the operating metric to a threshold criteria. The method 200 may further include, at stage 208, generating an output that reflects a relationship between the operating metric and the threshold criteria.

At stage 202, the monitor unit 102 may receive the strain data from the sensor 120. The strain data may correlate with deformation of the compression spring 118 that allows the safety valve 100 to open at a preset inlet pressure. This stage may include stages for sampling data from the sensor, for example, at some fixed time period or interval. Sampling may also occur in response to triggers or alerts from system controls that measure output metrics at the facility. The system may also "stream" data continuously. This feature may require additional stages to store (or write) data to a storage memory (or repository).

At stage 204, the monitor unit 102 may perform analysis on the strain data. The analysis may include stages for processing or using the strain data to calculate "total force" on the valve 108. As noted above, strain data is preferred because strain (in the compression spring 118) is proportional to spring force. Total force accounts for both the spring force and the gravitational weight of other valve components that maintain the valve 108 in its closed position. Further analysis may, in turn, equate the total force with set point of the valve 112 or the pressure required to compress the compression spring 118 in response to the preset inlet pressure. Other analysis may include stages for using the data to determine movement of the closure component 110. These stages may include detecting a maximum and a minimum in the data, which may describe movement that correlates with changes in state of the valve 108 as between its open position and its closed position. In this way, the method 200 may arrive at values that quantify both the number of times the valve 108 "opens" or "closes" or the time the valve 108 remains open (or closed). Time "open" and distance opened may account for volume of fluid that releases through the valve 108.

At stage 206, the monitor unit 102 may compare the metric with the threshold criteria. This stage may include stages for assigning the threshold criteria, for example, as the "stamped" set point for the safety valve 100. An example of the stamped value can be found as per ASME BPVC Section XI requirements.

At stage 208, the monitor unit 102 may generate the output. This stage may generate an alert that indicates potential performance issues for the safety valve 100. These issues may align with changes from factory-settings for the safety valve 100, including the stamped set point noted above. The alert may prompt the operator to change settings on the safety valve 100. For example, it may require the operator to adjust the pre-load unit 114 to increase or decrease the amount of compression of the compression spring 118 to change the spring force. This feature can allow the operator to tune the set point of the safety valve 100 back into compliance with regulatory performance standards outside of the normal evaluation period.

Figure 3:
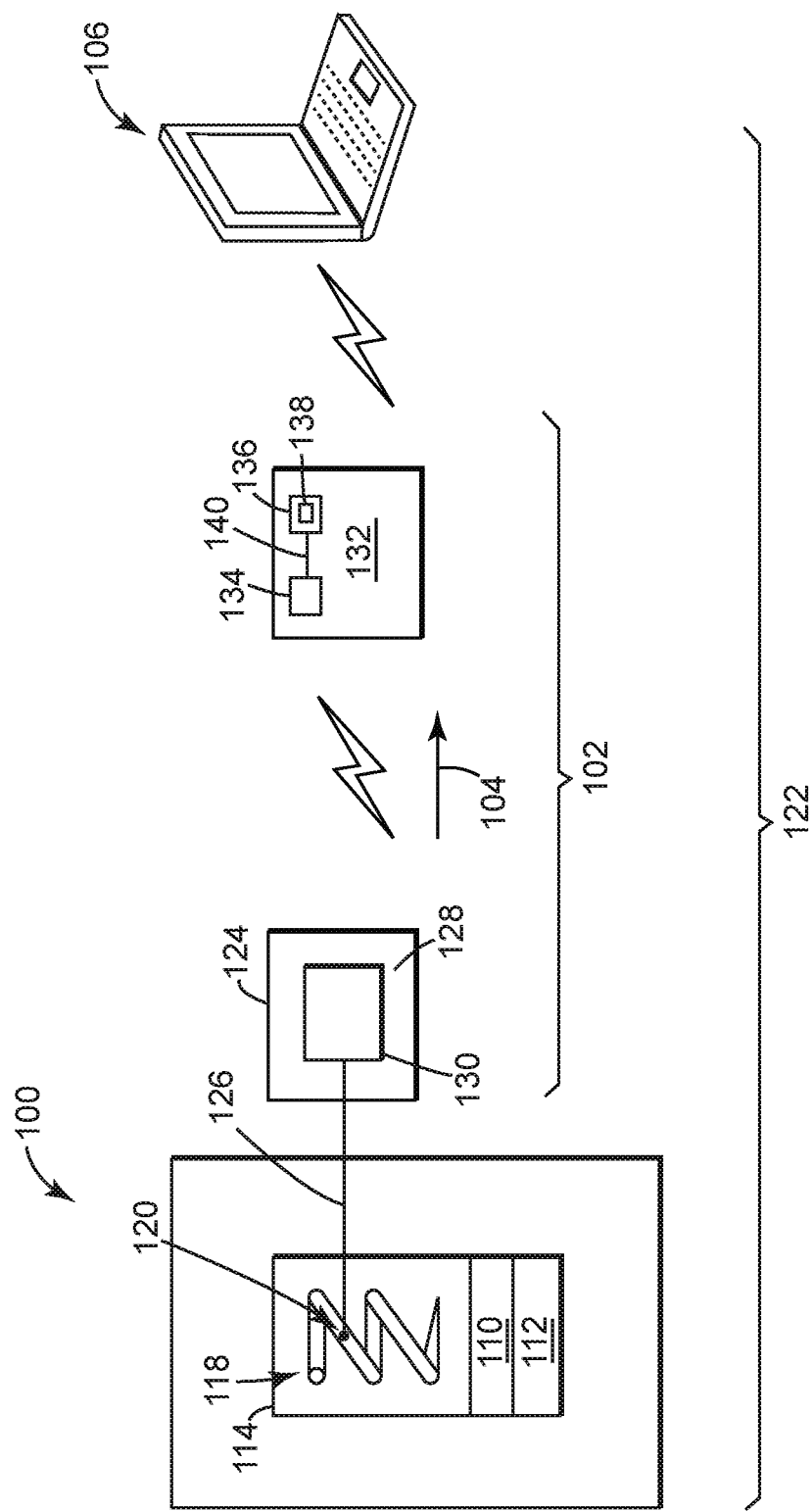
FIG. 3 depicts a schematic diagram of the safety valve of FIG. 1 with structure to transmit data.

FIG. 3 depicts, schematically, the safety valve 100 as part of a monitor system 122 that may help to process strain data from the sensor 120. The monitor unit 102 may include an on-board device 124 that secures to structure of the safety valve 100. The on-board device 124 may couple with the sensor 120, for example, by way of a connection 126 that may embody a wire or cable. Structure for the on-board device 124 may leverage a substrate 128, like a printed circuit board (PCB), which is configured to connect with the connection 126. The PCB 128 may also support and connect discrete devices (e.g., pressure transducers, temperature sensors, acoustic sensor, etc.) together to facilitate various data processing functions. These discrete devices may comprise a communication unit 130 that may be configured to transmit and receive the signal 104. In one implementation, these configurations may have functionality that accords with use of a radio or an antenna that leverage Bluetooth, Zigbee, or like wireless or cellular protocols to wirelessly transmit strain data (via signal 104) from the safety valve 100 to a processing unit 132. But this disclosure does not foreclose the need for the on-board device 124 to include a connector to receive a wire or cable to connect with the processing unit 132 as well. Examples of the processing unit 132 may include computing components, for example, a processor 134 and memory 136 with executable instructions 138 stored thereon. These components may reside separately on the PCB 128, or integrate together as might be found on micro-controller. Bus structure 140 like an I²C interface, may allow for data to exchange among the computing components 134, 136, 138.

Figure 4:
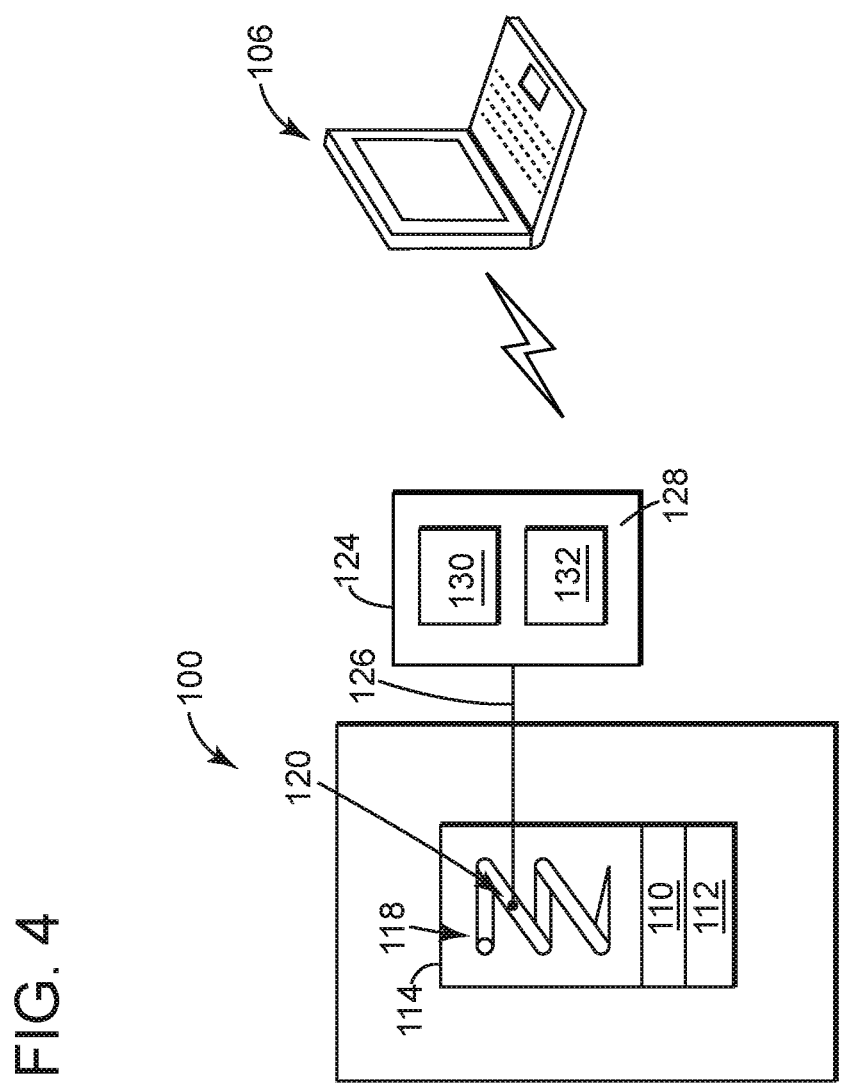
FIG. 4 depicts a schematic diagram of the safety valve of FIG. 1 with structure to process and transmit data.

FIG. 4 depicts a schematic diagram of the system 122 of FIG. 2. The on-board device 122 may include the processing unit 132. This feature may outfit the safety valve 100 with functionality for data processing as well, with "values" for the operating metrics sent to the terminal 106 for display on the user interface. Power availability may determine whether the safety valve 100 can support this additional processing functionality to implement this particular design.

Figure 5:
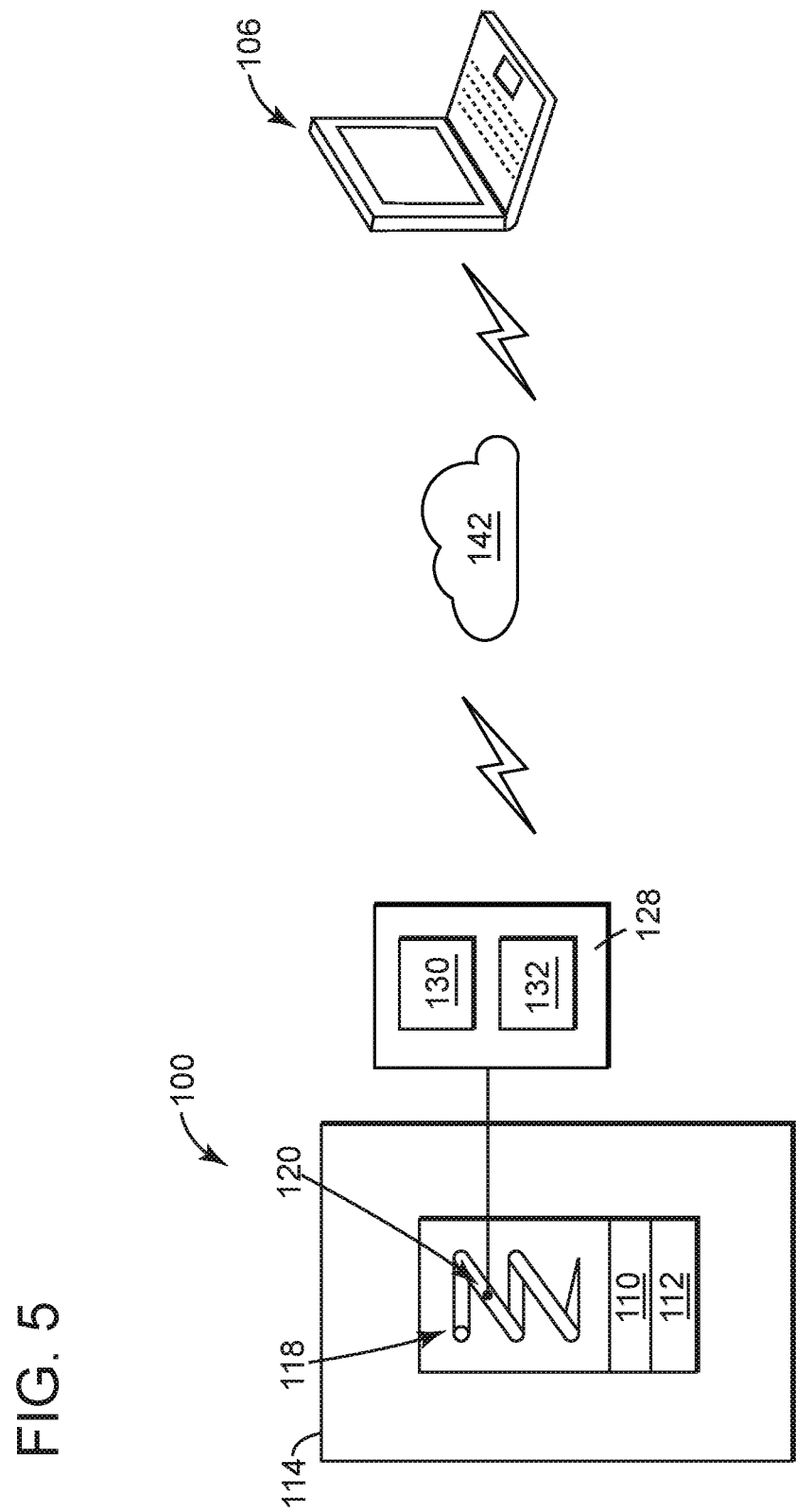
FIG. 5 depicts a schematic diagram of the safety valve of FIG. 1 with structure to transmit data over a network using a web server.

FIG. 5 depicts a schematic diagram of the system 122 of FIG. 2. The system 122 may leverage a network 142 to facilitate communication among the on-board device 124 and the terminal 106. Executable instructions 138 may implement a "web server" that configures the on-board device 124 to format and "serve up" data and information to the terminal 106 via the network 106. This web server can allow the end user to use a web-based browser on the terminal 106 for data analysis and review. This feature, effectively, embodies the safety valve 100 as an autonomous diagnostic platform. Bi-directional remote access via the web browser may further permit the end user to control and access the safety valve 100 or its fleet counterparts from a single location.

The network 142 may be configured as part of an Asset Management Platform (AMP). The Predix™ platform available from General Electric ("GE") is a novel embodiment of AMP technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, manufacturers and operators of industrial assets, like the safety valves herein, can be uniquely situated to leverage its understanding of industrial assets themselves, models of such assets, and industrial operations or applications of such assets, to create new value for industrial customers through asset insights.

The network 142 and other systems and methods for managing industrial assets can include or can be a portion of an Industrial Internet of Things (IIoT). In an example, an IIoT connects industrial assets, like the safety valves, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

Integration of industrial assets with remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like such that enabling such an interface is rarely as simple as combining the industrial asset with a general purpose computing device.

Embodiments may enable improved interfaces, techniques, protocols, and algorithms for facilitating communication with and configuration of industrial assets via remote computing platforms and frameworks to address these problems and other problems resulting from the intersection of certain industrial fields and the IIoT. Improvements in this regard may relate to both improvements that address particular challenges related to particular industrial assets (e.g., safety valves) that address particular problems related to use of these industrial assets with these remote computing platforms and frameworks, and also improvements that address challenges related to operation of the platform itself to provide improved mechanisms for configuration, analytics, and remote management of industrial assets.

Figure 6:
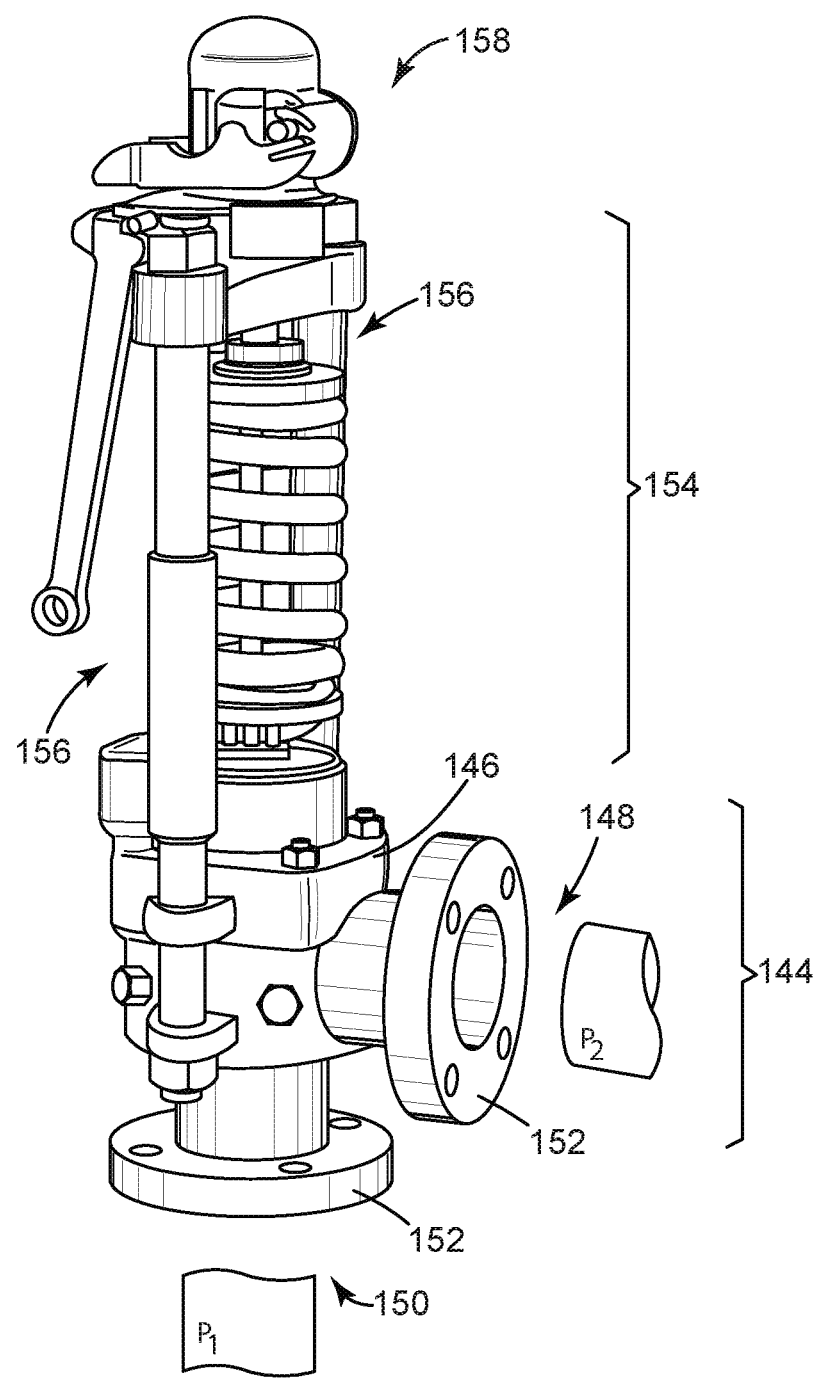
FIG. 6 depicts a perspective view of exemplary structure for the safety valve of FIG. 1.

FIG. 6 depicts a perspective view of structure for the safety valve 100. The structure may include a body 144 that forms a robust, fluid coupling 146 with a pair of openings (e.g., a first opening 148 and a second opening 150). The fluid coupling 146 may be configured to handle pressure of both the cooling fluid and resulting steam that is common to nuclear facilities and like power plants. These configurations may have structure, typically of cast, forged, or machined metal, to form a flow path for fluid to flow between pipes $P_1$, $P_2$. Flanges 152 (or other joint connections) at the openings 148, 150 may outfit the fluid coupling 146 to couple to pipes $P_1$, $P_2$. Fasteners like bolts may be used to ensure secure connection. The structure may also have a bonnet 154 with structural members 156 that attach to the fluid coupling 146. The structural members 156 may be of various construction. A mechanical actuator 158 may reside on top of the bonnet 154. The mechanical actuator 158 may couple with the preload unit 114 to pre-load the compression spring 118.

In light of the foregoing discussion, power plants and like facilities may benefit from use of the embodiments here that provide direct measure of strain (or other mechanical properties). The resulting data can form the basis to identify changes in performance of the device. A technical effect is to detect changes in set point and, in turn, allow for appropriate remediation to occur prior to any mandatory checks or testing that operators must perform across their fleet.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A safety valve, comprising:
   valve mechanics comprising a closure component moveable relative to a seat and a pre-load unit coupled with the closure component, the pre-load unit comprising a compression spring; and
   a strain gauge disposed on the compression spring, the strain gauge affixed on a coil that is spaced part from both ends of compression spring; and
   a processing unit coupled with the strain gauge, the processing unit comprising a processor, memory coupled with the processor, and executable instructions stored on memory, the executable instructions for,
      detecting maximum and minimum strain, and
      correlating the maximum and minimum strain with volume of fluid that flows through the seat.

2. The safety valve of claim 1, wherein the strain gauge comprises a Wheatstone bridge circuit.

3. The safety valve of claim 1, wherein the strain gauge comprises an electrical circuit that adheres to the spring.

4. The safety valve of claim 1, further comprising:
   a wireless radio coupled with the strain gauge.

5. The safety valve of claim 1, further comprising:
   the executable instructions for calculating spring force of the compression spring.

6. The safety valve of claim 1, further comprising:
   the executable instructions for determining deformation of the compression spring.

7. The safety valve of claim 1, further comprising:
   the executable instructions for generating an alert that deformation of the compression spring deviates from a threshold criteria that relates to set pressure.

8. The safety valve of claim 1, further comprising:
   the executable instructions for determining pressure required to compress the compression spring.

9. The safety valve of claim 1, further comprising:
   the executable instructions for quantifying movement of the closure component relative to the seat over time.

10. A system, comprising:
a valve assembly comprising a seat, a closure component moveable relative to the seat, and a compression spring deformable to maintain the closure component in contact with the seat;
a sensor configured to measure a mechanical property of the compression spring, the sensor affixed on a coil that is spaced part from both ends of the compression spring; and
a monitor unit comprising a processor, memory coupled with the processor, and executable instructions stored on memory, the executable instructions for,
detecting maximum and minimum strain, and
correlating the maximum and minimum strain with volume fluid that flows through the seat,
wherein the executable instructions further for using the data from the sensor to determine pressure on the closure component required to compress the compression spring.

11. The system of claim 10, wherein the mechanical property defines deformation of the compression spring.

12. The system of claim 10, wherein the sensor resides on the compression spring to generate data that reflects the mechanical property.

13. The system of claim 10, wherein the sensor comprises a strain gauge that resides on the compression spring to generate data that reflects the mechanical property.

14. The system of claim 10, wherein the sensor comprises an electrical circuit that resides on the compression spring to generate data that reflects the mechanical property.

15. The system of claim 10, wherein the sensor comprises a Wheatstone bridge circuit that resides on the compression spring to generate data that reflects the mechanical property.

16. The system of claim 10, further comprising:
a wireless antenna to exchange data between the sensor and the monitor unit.

17. A method, comprising:
receiving strain data from a sensor affixed on a coil that is spaced part from ends of a compression spring on a safety valve, where deformation of the compression spring allows the safety valve to open at a preset inlet pressure;
using the strain data,
determining pressure required to compress the compression spring in response to the preset inlet pressure,
detecting maximum and minimum strain, and
correlating the maximum and minimum strain with volume fluid that flows through the seat; and
generating an output that is configured to cause preemptive maintenance on the safety valve to occur in response to the pressure deviating from a threshold criteria.

18. The method of claim 17, wherein the threshold criteria is set pressure for the safety valve.

19. The method of claim 17, further comprising:
identifying a pre-load on the compression spring to increase spring force to bring the pressure closer to the threshold criteria, wherein the output provides preemptive maintenance instructions that include the preload.

20. The method of claim 17, further comprising:
calculating pressure using proportionality of strain data to spring force of the compression spring.

* * * * *